United States Patent [19]

Steierman

[11] Patent Number: 4,545,052

[45] Date of Patent: Oct. 1, 1985

[54] DATA FORMAT CONVERTER

[75] Inventor: Herbert L. Steierman, Mountain View, Calif.

[73] Assignee: Northern Telecom Limited, Montreal, Canada

[21] Appl. No.: 574,147

[22] Filed: Jan. 26, 1984

[51] Int. Cl.$^4$ ............................................... H04J 3/00
[52] U.S. Cl. ......................................... 370/68; 370/99
[58] Field of Search ............................ 370/99, 100, 68

[56] References Cited

U.S. PATENT DOCUMENTS

| | | | |
|---|---|---|---|
| 3,816,666 | 6/1974 | Tomozawa et al. | 370/99 |
| 4,016,548 | 4/1977 | Law et al. | 370/99 |
| 4,344,170 | 8/1982 | Arita | 370/68 |

FOREIGN PATENT DOCUMENTS 2017368  9/1979  United Kingdom ................. 370/99

*Primary Examiner*—Douglas W. Olms
*Assistant Examiner*—Frank M. Scutch, III
*Attorney, Agent, or Firm*—Schwartz, Jeffery, Schwaab, Mack, Blumenthal & Evans

[57] ABSTRACT

The conversion of bit-interleaved to byte-interleaved data is achieved using a memory and a universal shift register. The period of each bit-interleaved timeslot is divided into three parts for which corresponding timing signals are provided. During the first timing signal, the content of a memory location corresponding to an output channel is loaded into the universal shift register. During the second timing signal, the incoming bit associated with the timeslot is shifted serially into the register and during the third signal, the content of the register is returned to its original location in memory. After a frame of bit-interleaved data has been received at the register, the memory contains the corresponding frame of byte-interleaved data.

7 Claims, 4 Drawing Figures

DATA FORMAT CONVERTER

This invention relates generally to data handling circuits and more particularly to a circuit and method for converting a bit-interleaved data stream into byte-interleaved data.

Contemporary switching systems use pulse code modulation (PCM) and time division multiplexing (TDM) techniques. Therefore, the information being handled, including voice signals, consists of digital data signals that are usually either bit-interleaved or byte-interleaved. In the bit-interleaved data format, a frame of data comprises n subframes each having x bits whereas in a byte-interleaved data format, a frame of data comprises x subframes each having n bits. The standard transmission systems for digital data in North America uses the byte-interleaved format. Therefore, a switching system employing a bit-interleaved data format internally requires an interface circuit to the outside transmission facilities for converting from bit-interleaved to byte-interleaved data.

Because of the interleaving of the bits from the various channels of the system, the bit-to-byte direction of conversion is not a straightforward process although it may be accomplished with a circuit comprising a memory and a serial-to-parallel shift register. In such a circuit, the memory is loaded serially in one direction from the incoming data stream and read out serially from the other direction into the register which converts the data into bytes. For example, a bit-interleaved serial data stream is read into a memory in a column pattern until a frame of data has been stored. The memory is then read out serially one row at a time into serial-to-parallel shift register which provides byte-interleaved data at its output. Unfortunately, this process tends to be slower than is required in some applications.

It is therefore, an object of the invention to provide means for the bit-to-byte conversion of data which is faster than that heretofore known.

In accordance with the invention, there is provided a circuit and a method for converting bit-interleaved data formatted in a frame having n subframes each comprising x bits and wherein each frame consists of nx timeslots, into byte-interleaved data formatted in a frame having x channels each comprising n bits. The circuit comprises a memory means having at least one page of x locations each having at least n bits, a shift register adapted to accept and output parallel and serial data and serially shift its content, and means for generating, for each timeslot period, sequential first, second, and third timing signals. The memory means is responsive to memory address signals and to one of the first timing signals for reading out to the shift register the content of a memory means location corresponding to the address signals, the location corresponding to a predetermined one of the output channels. The shift register is responsive to the second timing signal of the same timeslot period as the first timing signal for shifting in serially the data bit available from the incoming bit-interleaved data stream. The memory means is then responsive to the third timing signal of the same timeslot period as the first and second timing signals for writing back into its original location, the content of the shift register. After a period of nx timeslots, the page of x locations of the memory means contains a frame of byte-formatted data.

The invention provides a circuit and method for converting incoming bit-interleaved data to byte-interleaved data one bit at a time whereby, after a frame of bit-interleaved data has been received at the circuit, a frame of byte-interleaved data is available in the memory means.

An example embodiment of the invention will now be described in conjunction with the drawings in which.

Figure 1A:
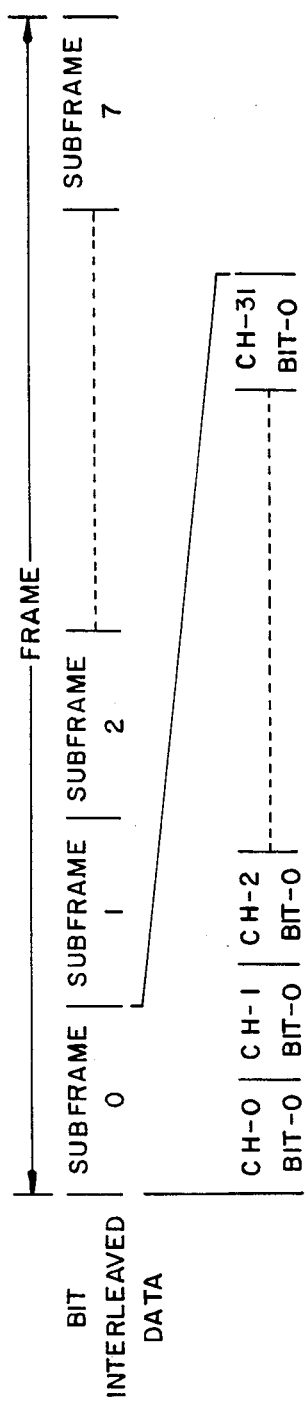
FIG. 1A is a pictorial representation of bit-interleaved data.

FIG. 1A illustrates bit-interleaved data wherein a frame of data comprises eight subframes each comprising thirty-two bits. It may be noted that each subframe consists of the similarly numbered bits from the various channels. For example, subframe 0 consists of the bits 0 from the 32 channels and subframe 7 contains the bits 7 from the 32 channels.

Figure 1B:
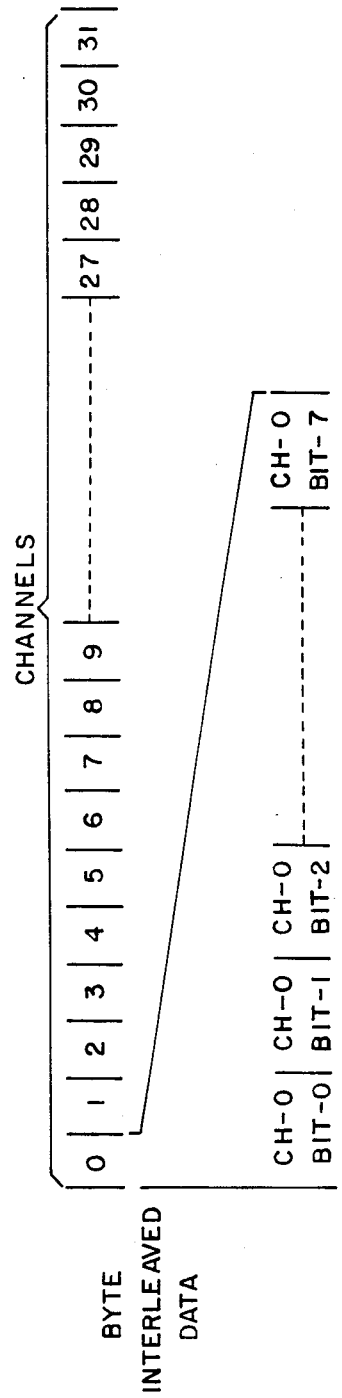
FIG. 1B is a pictorial representation of byte-interleaved data.

FIG. 1B illustrates the more conventional byte-interleaved data wherein each channel of a frame of data comprises bits 0 to 7.

Of course, it should be kept in mind that although FIGS. 1A and 1B show an eight-bit PCM, thirty-two channel format, other formats are entirely possible.

Figure 2:
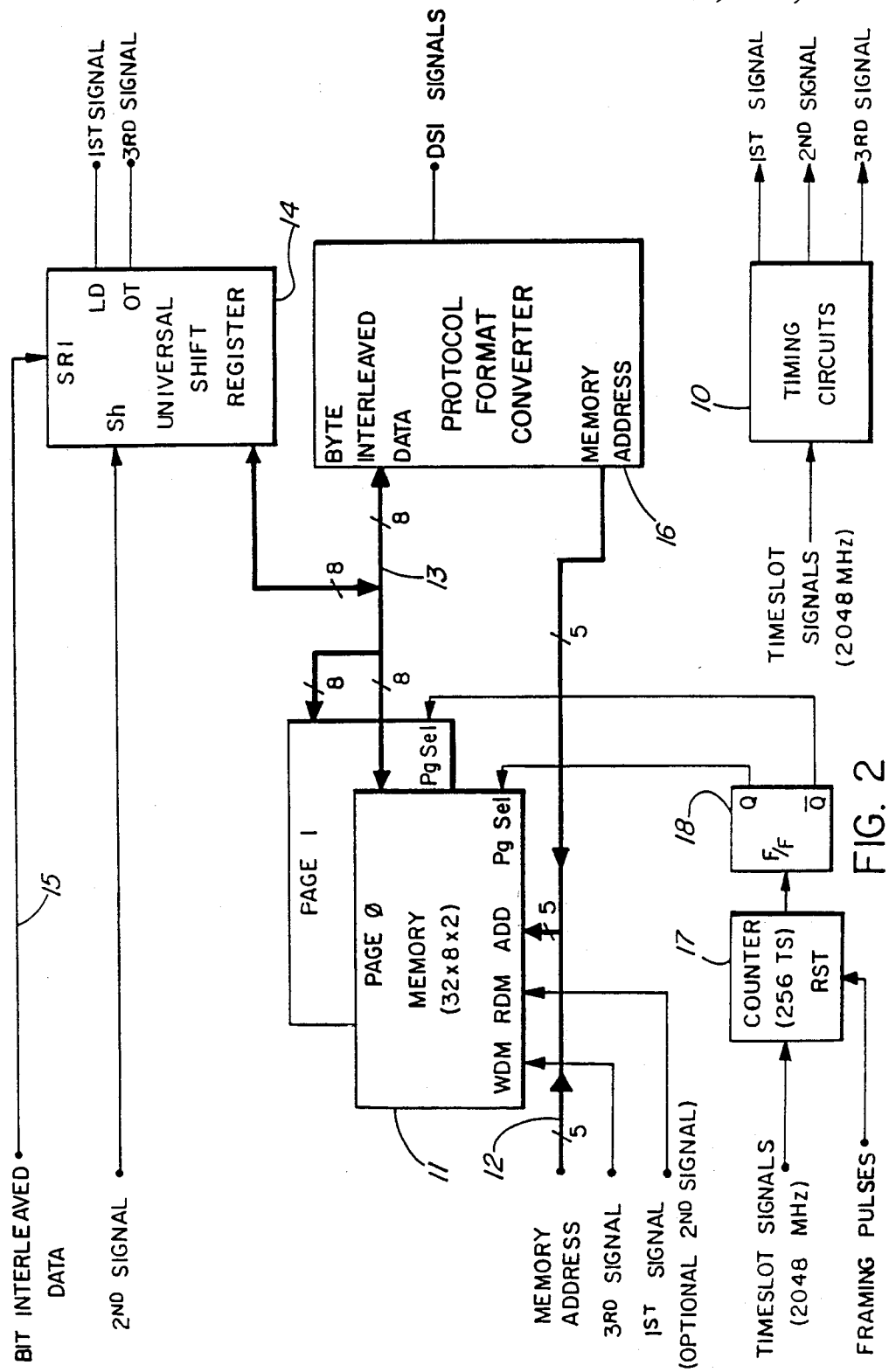
FIG. 2 is a logic block diagram of a converter circuit in accordance with the invention.
Figure 3:
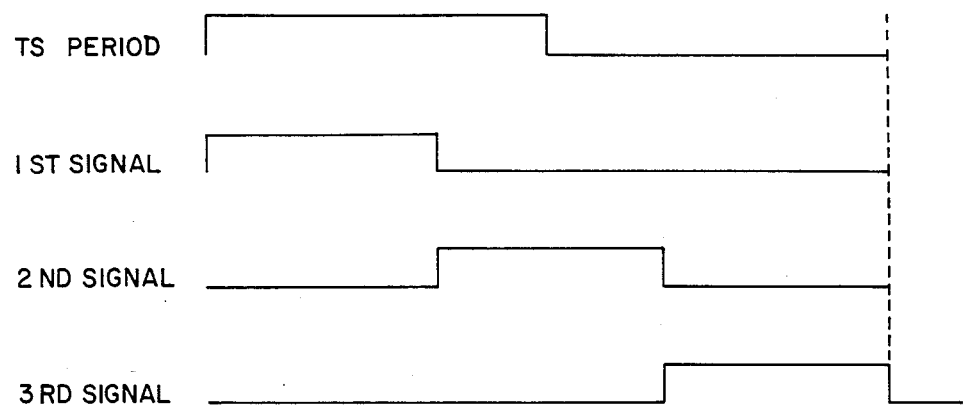
FIG. 3 is a timing diagram generated by a portion of the circuit of FIG. 2.

FIG. 2 is a logical block diagram of a converter circuit adapted to convert bit-interleaved data such as shown in FIG. 1A to byte-interleaved data as shown in FIG. 1B. There is shown a timing circuit 10 responsive to a clock or timeslot signal for generating three sequential timing signals during the period of each timeslot as illustrated in FIG. 3. A timeslot is defined as the period or duration of one bit. The design of such a timing circuit is well within the capability of any competent circuit designer and has therefore not been shown in detail. Also, the relative timing periods of the first, second, and third signals may vary from that illustrated in FIG. 3 as their exact relative periods is dependent on the choice of components in the remainder of the circuits.

The circuit comprises a memory 11 having pages 0 and 1, each page comprising thirty-two locations and each location having eight bits. Thus, each page can store one frame of data and each location is capable of storing one byte of data. A memory location is selected by memory address signals on address bus 12 and the data is read out from and written into memory 11 via a data bus 13 under control of the first and third timing signals respectively.

A universal shift register 14 has its parallel input and output connected to data bus 13 and a serial input SRI connected via lead 15 to a source of bit-interleaved data. The load (LD), serial shift (Sh) and output (OT) functions of register 14 are controlled by the first, second, and third timing signals or some derivative thereof.

The data bus 13 is also connected to a protocol format converter 16 which accepts byte-interleaved data comprising 32 channels, eight-bit PCM and common channel signalling for conversion to standard T1 or DS1 format (24 channels, imbedded signalling). This type of circuit usually employs bit slice processors and other very high speed circuitry. The output signal of the protocol format converter 16 is therefore compatible with the conventional digital transmission facility. It is the function of the circuit of the invention to make byte-interleaved data available to the protocol format converter 16.

Also shown in FIG. 2 is a counter 17 and flip-flop 18. The counter 17 is reset at the frame boundaries of the incoming data and is clocked until a count of 256 timeslots is reached. At this count, the flip-flop 18 is toggled and the page of memory is switched so that a new page may be filled with byte-interleaved data and a previously filled page may be made available to the protocol format converter.

The address bus 12 is time multiplexed between the source of bit-interleaved data and the byte-interleaved destination (16). During the periods of the first and third signals, the bit-interleaved source controls the address bus 12 and during the period of the second signal, the byte-interleaved destination controls the bus address bus 12. Therefore, during the period of the second signal, the protocol format converter 16 may read from the idle page of memory as required. The control signals necessary for controlling the access to the memory by the converter 16 may conveniently be derived from the output signals of the flip-flop 18 functionally ANDED with memory read commands from the converter 16.

The circuit of FIG. 2 may be entirely realized with off-the-shelf circuitry. For example, the memory 11 may be a high speed bipolar RAM such as serial number 29212D. Similarly, register 14 may be a universal shift register serial number 74S299 whereas the counter 17 and flip-flop 18 may be any ones of a large selection of available off-the-shelf components.

OPERATION OF THE CIRCUIT

For any one frame of data, the sequence of memory addresses should be constant. Let us assume that the sequence is from channel 0 to channel 31 and that a new frame of incoming data is beginning. The previously idle page of memory has therefore been switched to active status. The phrase idle page denotes the page of memory which is not being actively used for the conversion process and which possibly contains the previous frame of data.

During the first timeslot of the incoming frame of data—Ch-0, Bit-0—the first timing signal causes the content of the location at the memory address corresponding to channel 0 to be written in parallel into the register 14. The second timing signal then causes the bit of interleaved data appearing at terminal SRI to be shifted one position laterally into the register 14. The third timing signal causes the byte of data in the register 14 to be written back into the memory at the channel 0 address. The same method is then followed for the next thirty-one timeslots after which each location of the page of memory contains the corresponding bit (bit 0) from subframe 0. Similarly, at the completion of 256(8×32) cycles or timeslots, the page of memory contains one frame of byte-formatted data.

The following example will clarify further the operation of the circuit. Let us assume that the first bit from subframes 0 to 7 of a bit-interleaved frame of data constitute the word 1 0 1 1 0 1 1 1 and that the memory page being used for the conversion contains all zeros. After the first timeslot, the memory location corresponding to channel 0 contains the byte 0 0 0 0 0 0 0 1 and after 129(128+1) timeslots, it contains 0 0 0 0 1 0 1 1 whereas at the completion of 225 timeslots, it contains the byte 1 0 1 1 0 1 1 1. After 256 timeslots, the page of memory contains a frame of x bytes of data.

During the period of the second timing signals, the protocol converter 16 can read any location of the idle page of the memory since the memory access circuitry is not being used for the conversion process during that period of time. The converter 16 simply has to provide a memory location address and a read memory signal to receive the byte of data from the addressed location via the bus 13.

What is claimed is:

1. A circuit for converting bit-interleaved data formatted in a frame having n subframes each comprising x bits and wherein each frame consists of nx timeslots, into byte-interleaved data formatted in a frame having x channels each comprising n bits, the circuit comprising: memory means having at least one page of x locations each having at least n bits, means for generating, for each timeslot period, sequential first, second, and third timing signals, a shift register adapted to accept and output parallel and serial data and serially shift its content, means for connection to a source of said bit-interleaved data, said memory means being responsive to memory address signals and to one of said first timing signals for outputting in parallel to the shift register the content of the location corresponding to the address signals, the location corresponding to a predetermined one of said channels, the shift register also being responsive to the first timing signal for receiving the content of the memory means location and being responsive to the second timing signal of the same timeslot period as said one of said first timing signals for shifting in serially the data bit available at said connection means and being responsive to the third timing signal of the same timeslot period as said second timing signal for outputting its contents to the memory means, and the memory means being responsive to said third timing signal for writing back into said location the content of the shift register, whereby, after nx timeslots, the page of x locations of the memory means contains a frame of byte-formatted data.

2. A circuit as defined in claim 1 wherein the memory means comprises at least two pages of x locations each having at least n bits and further comprising, means for marking the boundary of each incoming frame of bit-interleaved data and for alternately enabling the pages of the memory means every nx timeslots, whereby the idle page of memory may be read out.

3. The circuit as defined in claim 2 wherein the means for marking comprises a counter adapted for counting at least up to nx timeslots, the counter being reset at every frame boundary of the bit-interleaved data, the output of the counter being effective for switching from the active to the previously idle page of the memory means.

4. A method of converting bit-interleaved data formatted in a frame having n subframes each comprising x bits and wherein each frame consists of nx timeslots, into byte-interleaved data formatted in a frame having x channels each comprising n bits, including a circuit comprising a memory means having at least one page of x locations each having at least n bits, a shift register adapted to accept and output parallel and serial data and serially shift its content, the register shift having a first input for connection to a source of bit-interleaved data and a second input for connection to the memory means, and means for generating and supplying timing signals to the memory means and the shift register, the method comprising the steps of:

(a) generating sequential first, second and third timing signals for each timeslot period;
(b) during said first timing signal of each timeslot, loading into the shift register the contents of a memory location allocated to the x channel associated with the timeslot;
(c) during the second timing signal, serially shifting into the shift register, the bit from the bit-interleaved data associated with the timeslot; and
(d) during the third timing signal, loading the contents of the shift register back into the memory location allocated to the x channel associated with the timeslot;

whereby after nx timeslots, each location of the memory contains a byte of data and the page of x locations of memory contains a frame of byte-formatted data.

5. The method defined in claim 4 wherein the memory comprises at least two pages of x locations and the method further comprises the step of marking the boundary of each incoming frame of bit-interleaved data, and in response thereto, switching from the active to the previously idle page of memory thereby operating on alternate frames of incoming data using alternate pages of the memory means, and allowing the idle page of memory to be read out.

6. The method defined in claim 5 and further comprising the step of reading out the byte-formatted data from the idle page of memory during the period of the second timing signals of the following frame of data.

7. The method defined in claim 5 wherein the step of marking is achieved by initiating a timeslot counter at the beginning of each incoming frame of bit-interleaved data and resetting it every nx timeslot.

* * * * *